(12) United States Patent
Parekh et al.

(10) Patent No.: US 9,078,045 B2
(45) Date of Patent: *Jul. 7, 2015

(54) SOCIAL BROADCASTING PLATFORM

(71) Applicant: Jelli, Inc., San Mateo, CA (US)

(72) Inventors: Jateen P. Parekh, San Francisco, CA (US); Michael S. Dougherty, Burlingame, CA (US); Scott Strain, Hayward, CA (US); Mitchell A. Yawitz, Belmont, CA (US); Sarah Caplener, Santa Cruz, CA (US)

(73) Assignee: Jelli, Inc., San Mateo, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 13/905,551

(22) Filed: May 30, 2013

(65) Prior Publication Data

US 2013/0340016 A1 Dec. 19, 2013

Related U.S. Application Data

(63) Continuation of application No. 12/317,489, filed on Dec. 22, 2008, now Pat. No. 8,490,133.

(60) Provisional application No. 61/008,961, filed on Dec. 21, 2007.

(51) Int. Cl.
*H04N 7/173* (2011.01)
*H04N 21/61* (2011.01)
(Continued)

(52) U.S. Cl.
CPC ........... *H04N 21/6175* (2013.01); *G06Q 50/01* (2013.01); *H04N 21/23109* (2013.01);
(Continued)

(58) Field of Classification Search
None
See application file for complete search history.

(56) References Cited

U.S. PATENT DOCUMENTS 6,600,898 B1 7/2003 De Bonet et al.
6,609,096 B1 8/2003 De Bonet et al.
(Continued)

FOREIGN PATENT DOCUMENTS

JP 2004364140 12/2004
WO 2004073306 8/2004

OTHER PUBLICATIONS

TMCnet.com, TMC News, Will Internet Radio Revolution Mean its Time to Hang the DJ?, Apr. 5, 2007.
(Continued)

*Primary Examiner* — Brian T Pendleton
*Assistant Examiner* — Ryan Stronczer
(74) *Attorney, Agent, or Firm* — Van Pelt, Yi & James LLP

(57) ABSTRACT

A method of social broadcasting is disclosed. A metadata is generated indicating items of content expected to be included in a broadcast and for each item of content a manner in which the item of content is to be included in the broadcast. The metadata is provided and at least a subset of said items of content to a broadcast platform in one or more network communications sent to the broadcast platform via a network interface. A method of social broadcasting is disclosed. A metadata is received via a server interface indicating items of content expected to be included in a broadcast and for each item of content a manner in which the item of content is to be included in the broadcast. At least a subset of said items of content is stored in a media cache. Said items of content are used to assemble in the manner indicated by said metadata, and to provide as output for broadcast to the station interface, a broadcast stream, including by responding dynamically to subsequently received metadata indicating a change in one or both of (1) said items of content expected to be included in a broadcast and (2) the manner in which one or more of said items of content is or are to be included in the broadcast.

20 Claims, 10 Drawing Sheets

(51) Int. Cl.
 G06Q 50/00 (2012.01)
 H04N 21/231 (2011.01)
 H04N 21/235 (2011.01)
 H04N 21/2668 (2011.01)
 H04N 21/2743 (2011.01)
 H04N 21/475 (2011.01)
 H04N 21/81 (2011.01)
 G06Q 30/02 (2012.01)
 H04L 29/08 (2006.01)
 H04H 20/38 (2008.01)

(52) U.S. Cl.
 CPC ....... H04N21/2353 (2013.01); H04N 21/2668 (2013.01); H04N 21/2743 (2013.01); H04N 21/4758 (2013.01); H04N 21/812 (2013.01); G06Q 30/02 (2013.01); H04L 67/306 (2013.01); H04H 20/38 (2013.01)

(56) References Cited

U.S. PATENT DOCUMENTS

| | | | |
|---|---|---|---|
| 6,718,551 B1* | 4/2004 | Swix et al. | 725/32 |
| 6,985,694 B1 | 1/2006 | De Bonet et al. | |
| 7,028,082 B1 | 4/2006 | Rosenberg et al. | |
| 7,076,561 B1 | 7/2006 | Rosenberg et al. | |
| 7,133,924 B1 | 11/2006 | Rosenberg et al. | |
| 7,500,257 B2* | 3/2009 | Berstis | 725/12 |
| 7,555,020 B2* | 6/2009 | Marko et al. | 370/535 |
| 7,840,178 B2* | 11/2010 | Hellman | 455/3.02 |
| 7,867,086 B2* | 1/2011 | Sitrick | 463/31 |
| 8,315,950 B2 | 11/2012 | Conley et al. | |
| 2002/0053078 A1* | 5/2002 | Holtz et al. | 725/14 |
| 2002/0078441 A1* | 6/2002 | Drake et al. | 725/9 |
| 2002/0144262 A1* | 10/2002 | Plotnick et al. | 725/32 |
| 2002/0194598 A1* | 12/2002 | Connelly | 725/39 |
| 2003/0229900 A1* | 12/2003 | Reisman | 725/87 |
| 2004/0116088 A1 | 6/2004 | Ellis et al. | |
| 2004/0158860 A1* | 8/2004 | Crow | 725/46 |
| 2006/0184977 A1* | 8/2006 | Mueller et al. | 725/86 |
| 2006/0218617 A1* | 9/2006 | Bradstreet et al. | 725/135 |
| 2006/0248569 A1* | 11/2006 | Lienhart et al. | 725/135 |
| 2006/0277569 A1* | 12/2006 | Smith | 725/35 |
| 2006/0288074 A1* | 12/2006 | Rosenberg | 709/205 |
| 2007/0067800 A1* | 3/2007 | Wachtfogel et al. | 725/42 |
| 2007/0107008 A1 | 5/2007 | Dybus | |
| 2007/0156230 A1 | 7/2007 | Dugan et al. | |
| 2007/0186230 A1* | 8/2007 | Foroutan | 725/24 |
| 2007/0256021 A1 | 11/2007 | Prager et al. | |
| 2007/0291404 A1 | 12/2007 | Morse et al. | |
| 2007/0294297 A1 | 12/2007 | Kesteloot et al. | |
| 2008/0046930 A1* | 2/2008 | Smith et al. | 725/46 |
| 2008/0092168 A1* | 4/2008 | Logan et al. | 725/44 |
| 2008/0115161 A1* | 5/2008 | Kurzion | 725/32 |
| 2008/0127241 A1* | 5/2008 | Garcea | 725/24 |
| 2008/0134232 A1* | 6/2008 | Rhoads | 725/28 |
| 2008/0222314 A1 | 9/2008 | Matsushita et al. | |
| 2009/0049469 A1* | 2/2009 | Small et al. | 725/35 |
| 2009/0083788 A1* | 3/2009 | Russell et al. | 725/34 |
| 2009/0125934 A1* | 5/2009 | Jones et al. | 725/28 |
| 2009/0228910 A1* | 9/2009 | Christinat et al. | 725/11 |
| 2009/0288110 A1* | 11/2009 | Logan et al. | 725/24 |
| 2010/0153572 A1 | 6/2010 | Feig et al. | |

OTHER PUBLICATIONS

Federal Communications Commission, FCC 01-90, FCC Industry Guidance on the Commission's Case Law Interpreting 18 U.S.C. § 1464 and Enforcement Policies Regarding Broadcast Indecency, Adopted Mar. 14, 2001, Released Apr. 6, 2001, Retrieved from http://transition.fcc.gov/eb/Orders/2001/fcc01090.doc.

Doug Reece, Webcasts Could Be Wave of the Future for Radio, Billboard, Feb. 22, 1997, 109, 8, ProQuest Central, p. 1 con't on p. 88 (two pgs).

* cited by examiner

SOCIAL BROADCASTING PLATFORM

CROSS REFERENCE TO OTHER APPLICATIONS

This application is a continuation of co-pending U.S. patent application Ser. No. 12/317,489 entitled SOCIAL BROADCASTING PLATFORM filed Dec. 22, 2008 which claims priority to U.S. Provisional Patent Application No. 61/008,961 entitled SOCIAL MEDIA SERVICE PLATFORM filed Dec. 21, 2007 which are incorporated herein by reference for all purposes.

BACKGROUND OF THE INVENTION

Traditionally the content broadcast by media outlets has been determined virtually without direct input from consumers of the content. Throughout this specification, "media" may refer to any form of information transmission, for example radio, television, other communication using electromagnetic waves, cable, and/or computer transmissions. Throughout this specification, "users" refer to any consumers of the content, including listeners and viewers of the content.

Without direct input from consumers, media outlets are designed for broadcasts based on content programming from one or a limited number of sources. Additionally, in many instances the content programming is done well in advance of broadcast, with only limited opportunities for real-time or near real-time adjustment to the content programming. As a consequence, media outlets remain static and do not permit a more open style for programming, both in terms of what content is to be broadcast and the manner in which content is to be included in the broadcast.

BRIEF DESCRIPTION OF THE DRAWINGS

Various embodiments of the invention are disclosed in the following detailed description and the accompanying drawings.

DETAILED DESCRIPTION

Figure 1:
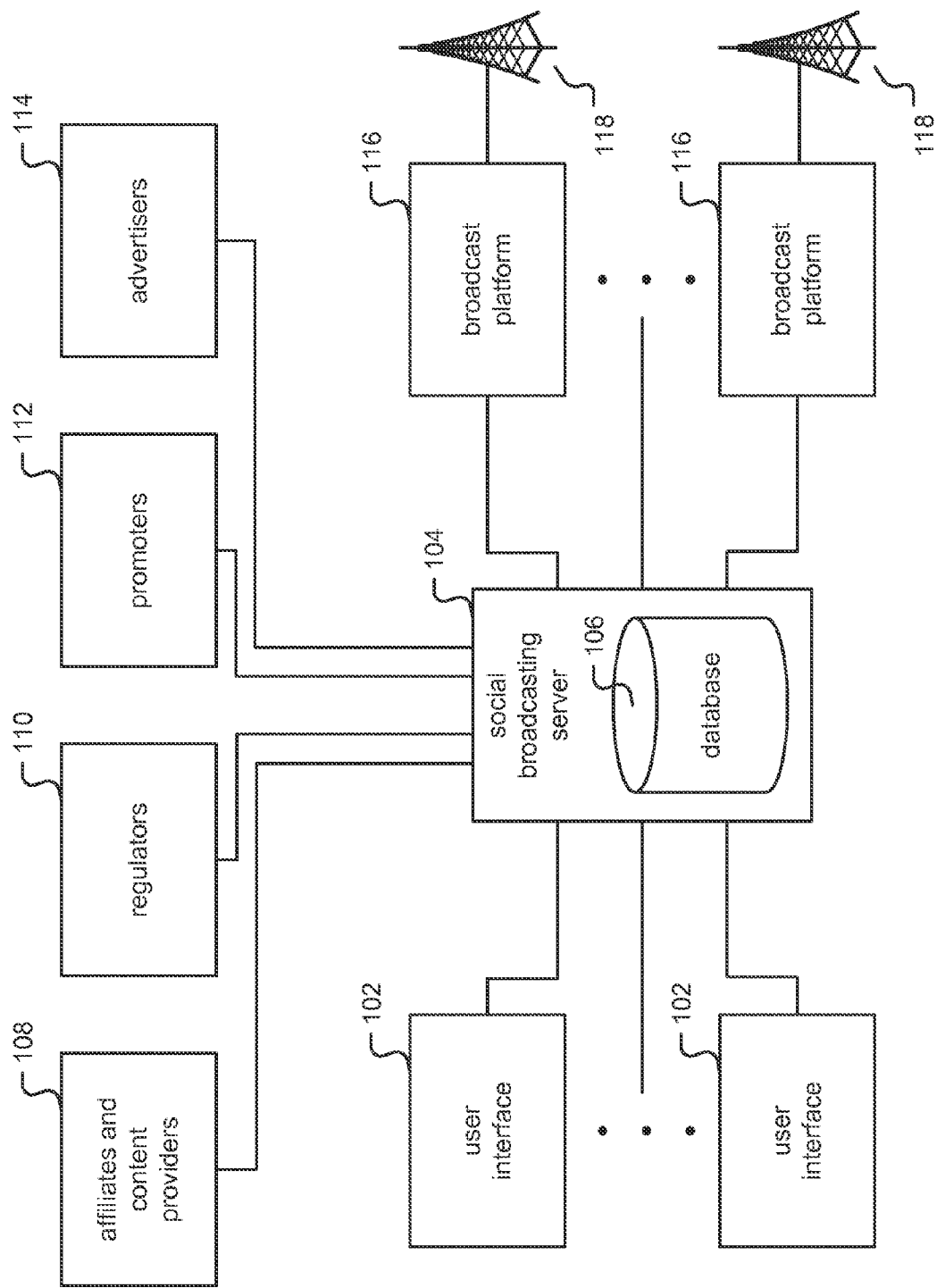
FIG. 1 is a block diagram illustrating an embodiment of a system for social broadcasting.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A new social broadcasting platform based on the concept of "social broadcasting" is disclosed. Throughout this specification, "broadcast" may refer to any one-to-many communication, including: radio broadcast, terrestrial radio broadcast, satellite radio broadcast, cable radio broadcast, digital radio broadcast, television broadcast, terrestrial television broadcast, satellite television broadcast, cable television broadcast, digital television broadcast, broadcast over electromagnetic waves, broadcast over electromagnetic signals, broadcast over coaxial cable, and broadcast over twisted pair cable.

In some embodiments, a media application running on a social broadcasting server generates a program stream comprising metadata and content. A broadcast platform network interface provides, via one or more network communications, the program stream to a broadcast platform. The broadcast platform receives the program stream and stores some of the content in a media cache. A playback engine provides a broadcast stream by using the program stream's content to assemble in a manner indicated by the program stream's metadata, and to provide a broadcast stream as output to a station interface, including by responding dynamically to subsequently received program streams and/or metadata. Subsequently received program streams and/or metadata may indicate a change in one or both of the content expected to be included in a broadcast and the manner in which the content is to be included in the broadcast.

In various embodiments, a social web is connected directly to a broadcast infrastructure, enabling the broadcast to evolve. The traditional broadcast model is inverted and opened by enabling users and communities to control and dictate programming via a simple web and/or mobile user experience and in some embodiments an open web services platform. The collective interest and participation of a community are automatically aggregated on a real-time basis and the result broadcast. In some embodiments, users can share their favorite content with a broad community, and content owners, artists and individuals can directly promote their works on air. In some embodiments, a scalable method for user generated content to be broadcast widely is provided. An open platform for third party communities, web sites and affinity groups to directly participate is provided in some embodiments.

In various embodiments, content is processed dynamically to provide a content stream that is ready for broadcast, for example, by adjusting audio levels and managing transitions between content, and downloaded to the broadcast infrastructure. Interactive features, integrated into the broadcast, drive user participation and loyalty.

Users or groups can search for, nominate, vote for and contribute their favorite content for broadcast and content owners can promote their content driving their fans and communities to participate in the process. Groups and websites can integrate with open APIs to further participate.

In various embodiments, a user centric website and mobile interface facilitate community participation in determining broadcast content. Widget and voting tools for third party sites are provided in some embodiments. "Widget" is defined throughout this specification as an object on a site that a user interacts with, for example a component of a graphical user interface ("GUI"), or a set of virtual buttons. A real-time, dynamically changing play list combined with real-time download and intelligent caching of candidate and/or selected content are used to provide a community-driven broadcast stream. In some embodiments, an extensible, modular web services architecture supporting open APIs is used to facilitate participation of broadcast station and/or social broadcast service partners (content, advertising, application) in the social broadcast service and/or experience.

FIG. 1 is a block diagram illustrating an embodiment of a system for social broadcasting. In the example shown, users interact with social broadcasting using a user interface 102. There may be more than one user and/or user interface, for example a second user interface as shown in the figure. These user interface(s) are coupled to social broadcasting server 104, which includes one or more database(s) 106. Social broadcasting server 104 may be coupled other third parties, such as content provider(s) 108, regulator(s) 110, promoter(s) 112, and/or advertiser(s) 114. Social broadcasting server 104 is coupled to one or more media outlets, for example a broadcast platform 116 and broadcast station and/or infrastructure 118. Throughout this specification, a "broadcast outlet" refers to a media outlet. There may be more than one media outlet, for example a second broadcast interface and second broadcast station as shown in the figure. The program streams to multiple broadcast outlets may be the same program streams or they may be different program streams. Throughout this specification, "coupling" may refer to a connection through any public or private network and/or combination thereof, for example the Internet, an Ethernet, serial/parallel bus, intranet, Local Area Network ("LAN"), Wide Area Network ("WAN"), and other forms of connecting multiple systems and/or groups of systems together.

Users through user interface(s) 102 provide input that directly influences the content of a broadcast stream to broadcast station(s) 118, as described more fully below. These user interfaces include any method to provide input to a station including a telephone; voice input; voice mail; web browser; public Web API services; mobile message, for example simple messaging service ("SMS") or multimedia messaging service ("MMS"); or email.

Social broadcasting server 104 provides servers for services that coordinate the influence from the user interface(s) 102 to broadcast station(s) 118, and database management for database 106. In some embodiments the database 106 may be used to store user profiles and/or media outlet profiles. User profiles may contain user preference information, data reflecting user participation, user group or other affiliations, and/or demographic data. Media outlet profiles may include format information, rules governing content, constraints on and/or other preference regarding the degree, manner, terms, etc. of user participations, etc. In some embodiments the database 106 may be used to store downloaded/uploaded content, content received from content owners or distributors other than via download (or upload), user provided content, advertiser owned and/or provided content, system tones, internet content formatted into audio clips, and user audio "tags" or signatures.

Social broadcasting server 104 couples with content providers 108, including content providers, content owners, content distributors, or syndicators, for content to be considered for broadcast on broadcast station(s) 118. Regulators 110 include non-governmental and governmental bodies, commissions or agencies such as the Federal Communications Commission ("FCC"), or enablers of laws such as the Digital Millenium Copyright Act ("DMCA") which provide regulatory and legal requirements to social broadcasting server 104 for consideration when broadcasting on broadcast station(s) 118. Regulators 110 also include enablers of rules or policies for the broadcast station 118 itself, or for the rules or policies of the social broadcasting service. Promoters 112 include content stakeholders such as promoters, publishers, artists, groups, agents, enthusiasts, or any third party interested in promoting content from or not from content providers 108. Advertisers 114 include advertisers, ad networks, sales teams and any nonprofessional or professional third party interested in advertising a message on broadcast station(s) 118.

In some embodiments, social broadcasting server 104 determines dynamically, based at least in part on user and/or other input, a play list of content to be played on a broadcast station. In the example shown the play list and/or updates is sent to a broadcast platform 116, located in some embodiments at the media outlet's premises. The broadcast interface receives content from server 104 and/or directly from one or more other sources. In some embodiments content is cached at the broadcast interface and updated as or if the play list changes, for example in response to user community input. The broadcast platform 116 provides as output to broadcast station 118 a content stream that is ready for broadcast by broadcast infrastructure. Broadcast station 118 includes any broadcast infrastructure including infrastructure for radio frequency transmission between 3 Hz and 300 GHz, satellite infrastructure and computer network infrastructure. The broadcast is received and consumed by users such as a user associated or not associated with user interface 102 via a radio, television, phone, computer, or other suitable receiving and/or rendering device.

In some embodiments, social broadcasting server 104 provides a server for web service for interface 102, to influence directly the content broadcast by a media outlet 116/118. Candidate content is displayed in some embodiments, and users given the opportunity to vote for which content should or should not be broadcast. For example users and/or groups of users may vote to promote content they would like to be included and/or to demote or block content they do not prefer. In some embodiments users may create, supply, and/or identify candidate content to be voted on by others. Web services may also be used to interface with 108, 112 and 114.

In some embodiments, social broadcasting server 104 includes one or more of the following:

a voting engine configured to: receive user votes and determine which content is to be included in a broadcast stream; track votes by members of a defined group of users, for example one set up with an interest in mind, such as fans of a particular band, or users in a particular demographic; and administer weighted voting, in which the votes of some users are weighted more heavily than others, such as users who have participated more than other, contributed content received well by others, and/or have participated in other ways deemed to be advantageous, helpful, and/or well received;

a play list generation logic configured to: determine what content will be included; and link content items together to create an integrated and well synchronized content stream that is ready to broadcast, for example, linking a content item with a clip or content used to attribute the inclusion of the content item to a particular user or group. The output of 104 would be a content playlist, audio syntax, and links to content (for download);

a reporting/analytics logic, module, and/or engine configured to: gather and analyze user participation data to provide, for example to advertisers and ad networks, content owners, and/or others, information regarding how certain content has been received, which users and/or demographics have been and/or could be reached, etc.;

an audio application configured to: process content and stitch together content items of a variety of types and/or source formats and/or from a variety of sources in a way that provides a desired listening experience (or create a playlist with rules on how the broadcast platform can generate the stream); and an ad relevancy engine configured to select ad content items dynamically, for example by matching ad content to non-ad content items so that the two can be broadcast at the same time and/or matching ad content to a demographic determined based at least in part on user participation and associated profiles to be consuming or anticipated to be consuming the broadcast at a particular time, including by determining how many ads will be broadcast, in what order and placement, etc (even if consumer feedback is provided to advertisers.)

In some cases, content receiving the highest vote may not necessarily be the content included in a broadcast. In some embodiments a selection algorithm is configured and/or tuned to include to at least some degree content popular with a defined or other minority of users, for example users who like a particular sub-genre, flavor, or interpretation of content within a genre. In some embodiments, greater weight may be given to input from users whose input has proven valuable and/or popular or otherwise useful in the past. For example, a user who in the past provided and/or suggested content that proved to be popular with others may be given greater weight. In some embodiments, this is done through power-ups and tools rather than giving an individual more power, or this is done by users banding together as a group to vote up content.

"Power" users, defined as those who have participated and/or contributed a lot to the community; users who have engaged in desired behavior, for example by responding to a promotion and/or participating in a contest and/or navigating to particular locations on the community and/or social broadcaster web service, etc., may in various embodiments receive super-votes that enable them to guarantee that certain content will or will not be included. Furthermore, business requirements from content providers 108, promoters 112, advertisers 114, or the social broadcasting server 104, and/or regulatory requirements from regulators 110, may limit the broadcast period/frequency/timing of certain content, or even restrict content from broadcast inclusion. In some embodiments, a user may simply be provided tools to give more power.

In some embodiments, user participation that enables the broadcast and/or associated web page or other off-broadcast content to reflect the natural geographic affinity of a typical community of broadcast consumers is encouraged. For example, users are encouraged to post photos or other content from a local performance by a performer whose content has been included and/or is being promoted for potential inclusion in a broadcast. The local community is also encouraged to be heard and be active in the broadcast using one or more of: audio signature/avatar tones, vote activity, "shout outs" where users/groups grant attribution to other users/groups publically, internet feeds, Really Simple Syndication ("RSS") feeds, micro-blogging feeds, SMS/MMS feeds, and social networking feeds.

Content may include studio recordings, independent releases, user generated content, advertisements, operational content: for example, station identification; audio cues; and attribution as described below, and/or other content. Examples of user created and/or supplied content include audio and/or video recording of users performing music; user dialog or commentary; and content a user found on the Internet at a site that allows users to post media clips or other content. Users, artists, and content stakeholders like promoters 112, authenticate content ownership rights and provide permission to broadcast the content as part of the content upload process. In some embodiments, users must be able to provide credentials as part of the content upload process. Examples of credentials include one or more of: a manual or automatic method of validating content ownership rights, a result from a digital file identification service, a result from an electronic media identification service, a result from a copyright management solution, an audible fingerprint, an acoustic fingerprint, a visible fingerprint, a video fingerprint, a signature, and a digital signature (or certification that the user owns the right to content and is allowing broadcast of the content.)

In some embodiments, content owners/providers 108 and/or third party promoters 112 have the opportunity to participate, for example to rally users to support the inclusion of certain content in the broadcast. In some embodiments, a voting button or other widget is the user interface 102 made available to be included in third party sites, such as content owner 108 sites, fanzines, other online media sites, pages associated with online communities and/or online social networking, to enable viewers of such pages to cast votes that influence the broadcast directly from the third party page, without navigating to a page associated with social broadcasting server 104. In some embodiments an application programmers interface ("API") is used from the third party page that may or may not interface with social broadcasting server 104. Groups and third party websites in some embodiments can integrate with open APIs to further participate. Advertisers and/or advertising networks 114 may participate in a variety of ways, including by providing ad content. In some embodiments, ad content is or may be voted on, enabling advertisers to obtain feedback regarding which advertising content is preferred by which users.

In some embodiments, lightweight audio cues, for example a gong, buzz, or other tone or short clip, may be included in a broadcast, for example to alert the user community to an opportunity to provide input and/or view or otherwise access content on an associated website. For example, a particular tone may be broadcast between content items such as advertising content, to drive users to a website or other interface to vote on what non-advertising content should lead off the next segment, to participate in a real time contest or other competition, etc. In some embodiment an audio tone is played on the air to indicate a real-time user or community driven event.

In some embodiments, a user may receive acknowledgement and/or achieve status within the community by having his/her audio signature or "tag" included in a broadcast. For example, a user who created, provided, suggested, promoted, and/or was the last to vote for a content item selected by the community to be included in the broadcast may have his/her audio signature included in the broadcast immediately before or after the content item. Examples of such an audio signature or tag include a short clip of the user's voice; a tone or other content created, designed, provided, and/or selected by the user; a clip excerpted by the user from another source; an audio, audiovisual, or other avatar or clip selected by the user from a library of avatars or other clips; etc. In some embodiments, users sign up and create a user profile and for at least those users who choose to have an audio signature the signature or a pointer thereto is included in their user profile. The signature or pointer is retrieved from the profile for use, for example when the user participates in a manner that earns the user the right to receive attribution in the broadcast. Throughout this specification "avatar" describes a media representation of a user. In some embodiments, an audio avatar is an audio clip, song, signature, tag or recording used to represent a user. Participation by others may be encouraged simply by hearing/seeing content being attributed to other users and/or explicitly via the broadcast and/or website. In some embodiments a user's screen name is read out on the air via a text-to-speech engine conversion.

Figure 2:
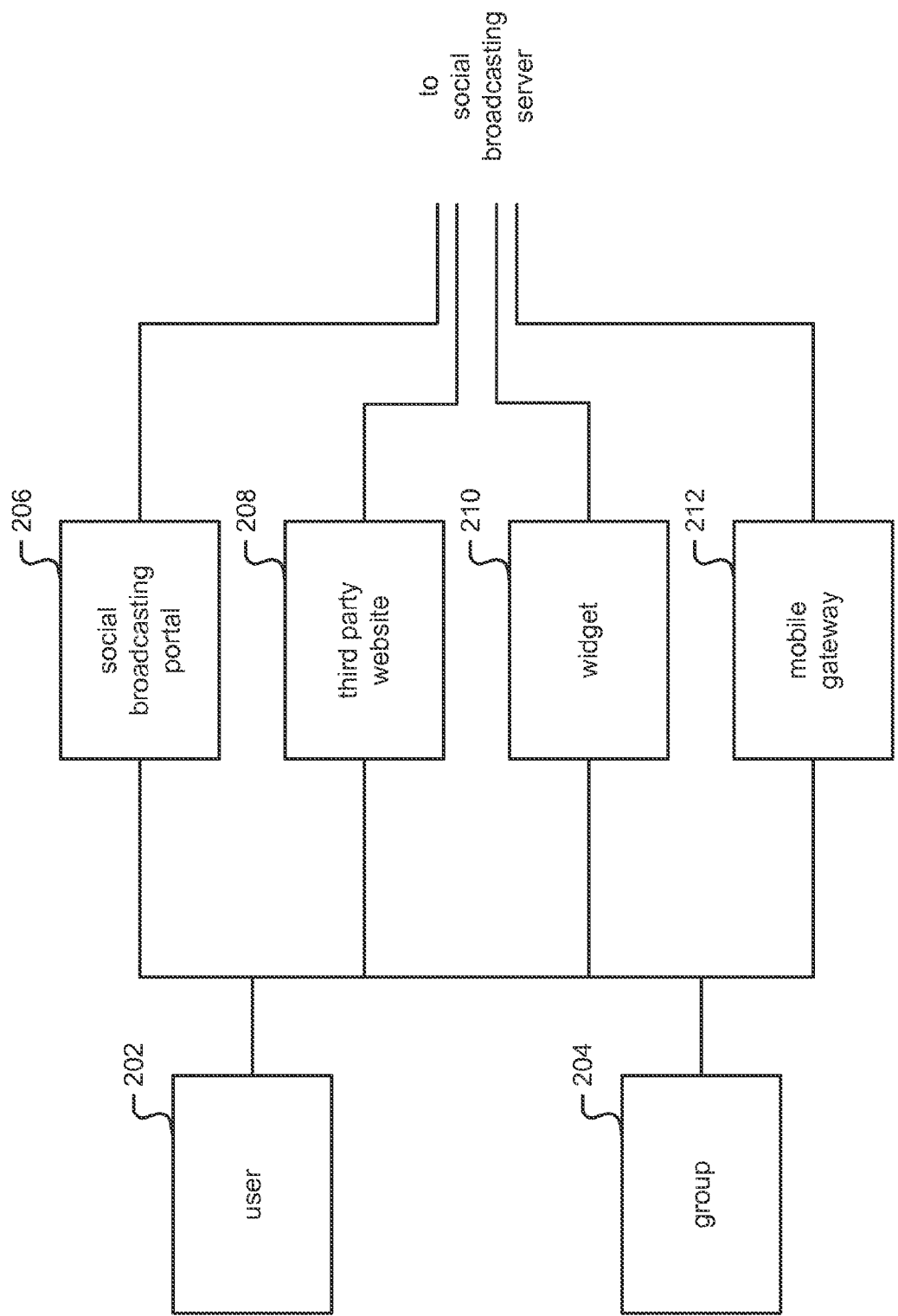
FIG. 2 is a block diagram illustrating an embodiment of a system for interfacing users with social broadcasting.

FIG. 2 is a block diagram illustrating an embodiment of a system for interfacing users with social broadcasting. In some embodiments, the user interface 102 in FIG. 1 is included in the system shown in FIG. 2. In the example shown, users 202 and group(s) of users 204 interact with one or more of: social broadcasting portal 206, third party website 208, widget 210, and mobile gateway 212. Each user interface 206-212 is coupled with social broadcasting server 104.

In some embodiments a social broadcasting portal 206 includes a web server that is hosted by the social broadcasting service owners, for example from or on social broadcasting server 104. The social broadcasting portal 206 allows users 202 to see what is currently playing on the associated broadcast and to indicate their opinions with real-time comments and voting with regards to currently rendering/playing and pending media content. Another example is using the social broadcasting portal 202 to determine a playlist for the associated media station, where content includes media, user contributions, and feeds from networks such as the Internet. Another example is using the social broadcasting portal 202 to allow users to create a playlist in a real-time style similar to a massive multiplayer game, allowing users to not only vote, but to use "power-ups". In some embodiments, super-votes include power-ups. An example of power-up is a "bomb", which reduces or eliminates users' votes for a certain piece of media content ("piece") and/or interrupts a broadcast to remove that currently playing piece. Another example of a power-up is a "rocket", which enhances or adds to users' votes for a certain piece and/or moves that piece to be next played on the broadcast.

In some embodiments, social broadcast portal 206 fosters an active community to power the selection of the broadcast. Social features may include instant messaging ("IM"), forums, messaging boards, bulletin boards, and a facility to form and maintain groups of users, for example group 204.

Social broadcast portal 206 encourages community activity and also may provide visualization of community activity including publication of user generated content, avatars to represent users, and analysis of community activity. In some embodiments, social broadcast portal 206 allows a user to interface to existing social networks for more seamless user registration, growth of the overall community, and community promotion capability.

In some embodiments, third party website 208 uses a web services platform to integrate social broadcast portal 206 and/or social broadcast server 104. In some embodiments, a third party website 208 is a partner site where users can vote on content or interact with it using a power-up. In some embodiments, a social network site may be integrated with the social broadcasting system using an application, for example a Facebook application. In some embodiments, third party sites may use a widget 210 for smoother integration in an existing site. The functionality of a widget may be as simple as a set of voting buttons.

In some embodiments, mobile gateway 212 enables interaction from user 202 and group 204 via mobile devices, for example mobile phones, mobile computers and mobile personal data assistants ("PDAs"). A mobile gateway 212 may permit interaction with the social broadcast system using messaging services, for example IM, TFN, SMS or MMS, web services, for example Wireless Application Protocol ("WAP"), proprietary network services, for example Binary Runtime Environment for Wireless ("BREW"), open network services, for example, Java (2) Platform Micro Edition ("JME" or "J2ME"), hardware services, for example Bluetooth, or email services. A user using a mobile device with mobile gateway 212 may be connected to the social broadcast system from anywhere and vote or game, track favorite pieces, by alerted about upcoming broadcasts and gaming, and upload content with the mobile device. In some embodiments networks from Wide Area 2G (GPRS, Edge), Wide Area 3G (CDMA, HSPA, UMTS, WiMAX), Local Area (WiFi, Ethernet, etc.), and Personal Area (BlueTooth) are used to interface with mobile gateway 212 and/or user interface 102.

In some embodiments, user profiles and/or identifiers may be shared with other third parties, to provide identification or other details/transactions/data of a user from user interface 102 who has not authenticated through the social broadcasting service and/or social broadcasting portal 206. For example, a user using a third party website 208 called Faceboon and/or a widget 210 on Faceboon may use/share Faceboon's user authentication to identify the user for the social broadcasting service.

Figure 3A:
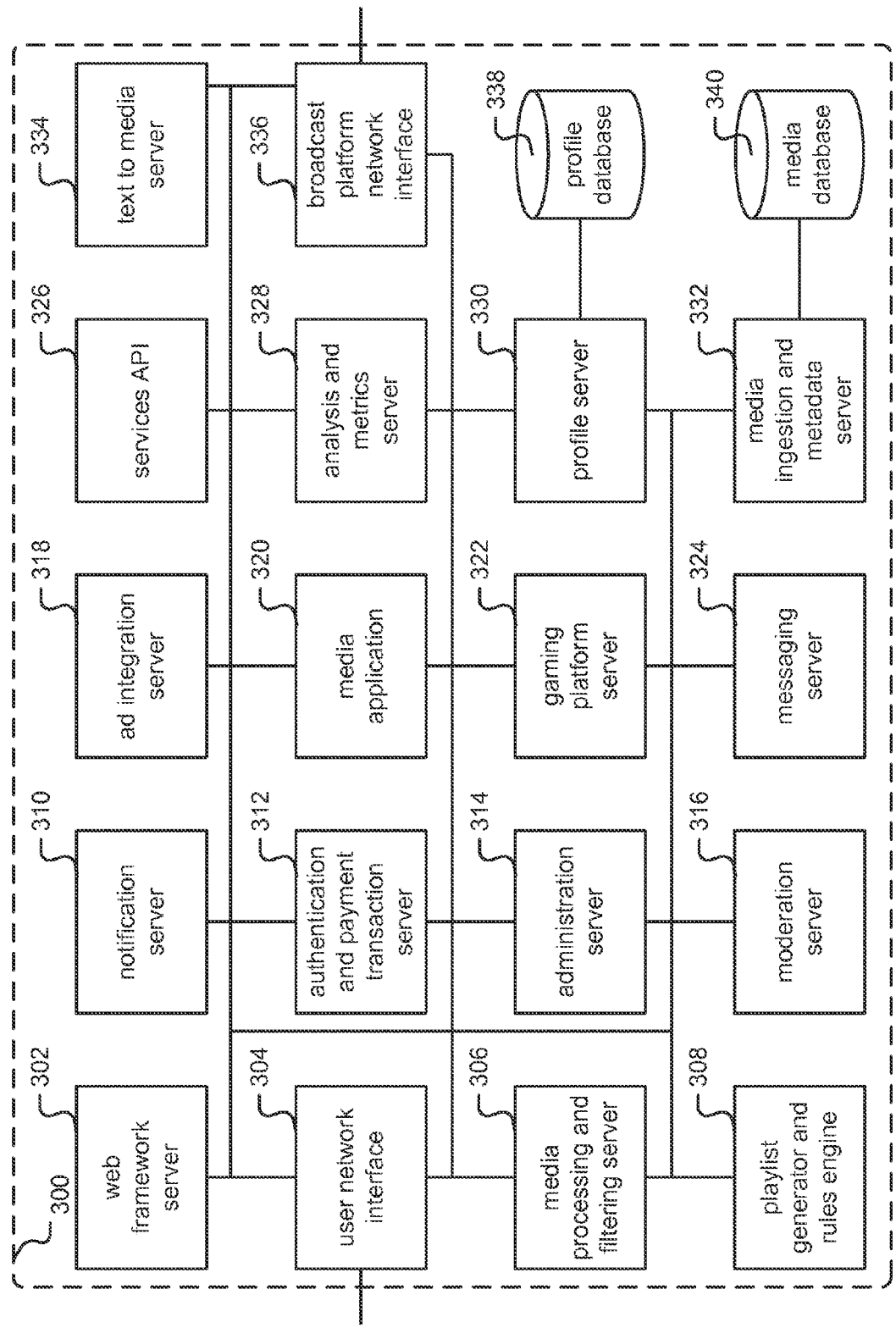
FIG. 3A is a block diagram illustrating an embodiment of a system for a social broadcasting server.

FIG. 3A is a block diagram illustrating an embodiment of a system for a social broadcasting server. In some embodiments, the system in FIG. 3A is included in social broadcasting server 104 in FIG. 1, and the user profile database 338 and media database 340 is included in database 108 in FIG. 1. The social broadcasting server in FIG. 3A may be in a single machine or span a plurality of machines, server farms or virtual data centers ("VDC") such as Amazon S3/EC2. User network interface 304 is coupled with user interface 102. Broadcast platform network interface 336 is coupled with broadcast platform 116. As shown in FIG. 3, each of the interfaces and servers shown are coupled with every other interface and server shown, profile server 330 is coupled with profile database 338, and media ingestion and metadata server 332 is coupled with media database 340. In the example shown, the social broadcasting server 300 in FIG. 3A comprises a plurality of servers and databases including:

Web server and framework 302, in part to service social broadcasting portal 206, and to expose communications interfaces configured to enable broadcast affiliates, users, and ad partners, for example, to interact with and participate in social broadcasting;

User network interface 304, in part to interface with user interface 102, including a network interface for processing network communications between the rest of the servers in FIG. 3A with one or more of: social broadcasting portal 206, third party website 208, widget 210, and mobile gateway 212;

Media processing and filtering server 306, in part to provide digital signal processing and filtering of content and media, for example volume normalization for audio media, brightness normalization for video media, or filtering content into alternate forms;

Playlist generator and rules engine 308, in part to provide coordination between APIs from users 202/groups 204/networks 108/affiliates 108 and requirements from regulators 110 and broadcast partners to form a playlist for broadcast station 118;

Notification server 310, in part to provide notification to users 202 and groups 204 about upcoming "alerts" and provide the user community an opportunity to vote, provide input, and/or view or otherwise access content on an associated website;

Authentication and payment transaction server 312, in part to facilitate economic exchanges between users 202, groups 204, network 108, affiliates 108 and/or the social broadcast system;

Administration server 314, in part to perform reporting, logging, internal moderation, financial, accounting, and distribution of royalties within the social broadcast system;

Moderation server 316, in part to provide moderation tools to ensure broadcasts are consistent in theme (e.g. jazz on jazz station), legal in form (e.g. comply with the FCC), and legal in ownership (e.g. preserves content ownership or license);

Ad integration server 318, in part to determine an estimate of the listening demographic and/or ad relevancy for a period of time, integrate with ad networks to provide near-in-time and/or just-in-time serving of ads, provide real-time ad measurement and analysis, and allow users 202 and/or groups 204 to vote on ads;

Media application 320, in part to output the integrated media experience from the playlist generated in rules engine 308, for example an audio application to provide facilities for multiple tracks/pieces/content, mixing and sequencing;

Gaming platform server 322, in part to provide a system of participation economics, voting dynamics and gaming dynamics for users 202 and/or groups 204 to determine broadcast content, and for alternate entertainment related or unrelated to the broadcast content;

Messaging server 324, in part to coordinate real-time or delayed messaging between users 202 and/or groups 204, generate "social noise", defined throughout this specification as visualization/audiolization of current community activity and/or a sense perceptible indication of a current level of user participation in the social broadcast environment; facilitate "messaging" as directed communication between users, sets of users, or groups; and facilitate other communication between users 202 and/or groups 204;

Services API 326, in part to enable interfacing with sites, web sites, portals, mobile technologies, web applications, and/or widgets, including third party website 208, widget 210, and mobile gateway 212, and using for example open APIs;

Analysis, reporting, analytics and metrics server 328, in part to analyze station statistics with information equal to or superior to Arbitron or Nielsen ratings based in part on user community information, analyze demographics statistics of the user community for a given period of time, and report statistical information;

Profile server 330, in part to generate, facilitate and maintain profiles for users and/or media outlets/stations as described above, and provide an interface and/or database management for profile database 338;

Media ingestion and metadata server 332, in part to take content from disparate sources and "ingest" or normalize format and content for a consistent broadcast, add, modify or delete metadata about each content piece, user 202 and/or group 204, and provide an interface and/or database management for media database 340. Media ingestion and metadata server 332 may in some embodiments also include an affiliate data and content server, in part to service data, such as programming and metadata, and content for broadcast network affiliates 108, where throughout this specification "affiliates" includes network affiliated stations 108, network-owned stations 108 and any content providers 108. In some embodiments the media ingestion and metadata server 332 processes cross media indexing or connections, for example enabling the song to play "off-line", or on the air, linking to lyrics on a web site, linking song content about products or services to ads, etc.;

Text to media server 334, in part to take text or other forms of input from users and/or user profiles, for example gestures or strokes, and upconvert them to alternate forms of media/communication, for example speech (text-to-speech), voice, music, visualization patterns, and/or video;

Broadcast platform network interface 336, in part to interface content/data from the rest of the servers in FIG. 3A to broadcast platform 116 and broadcast station 118, and in some embodiments using a language and/or program stream, for example eXtensible Markup Language ("XML") to couple with the broadcast interface;

Profile database 338, in part to facilitate storage of profiles for users 202, groups 204, and media outlet 116/118, including preference information, participation information, affiliations, demographic data, format information, rules, constraints, etc.;

Media database 340, in part to facilitate storage of media and other content, for example music, audiobooks, video, user-generated content, network feeds, Internet feeds, audio libraries, ads, station audio clips, social broadcasting audio clips, chrome, bumpers, playlists, logs, gaming data, and messaging.

Media Ingestion. In some embodiments, a content upload workflow for media ingestion and metadata server 332 includes providing at least two options: one for commercial track uploading and one for user-generated content uploading.

Figure 3B:
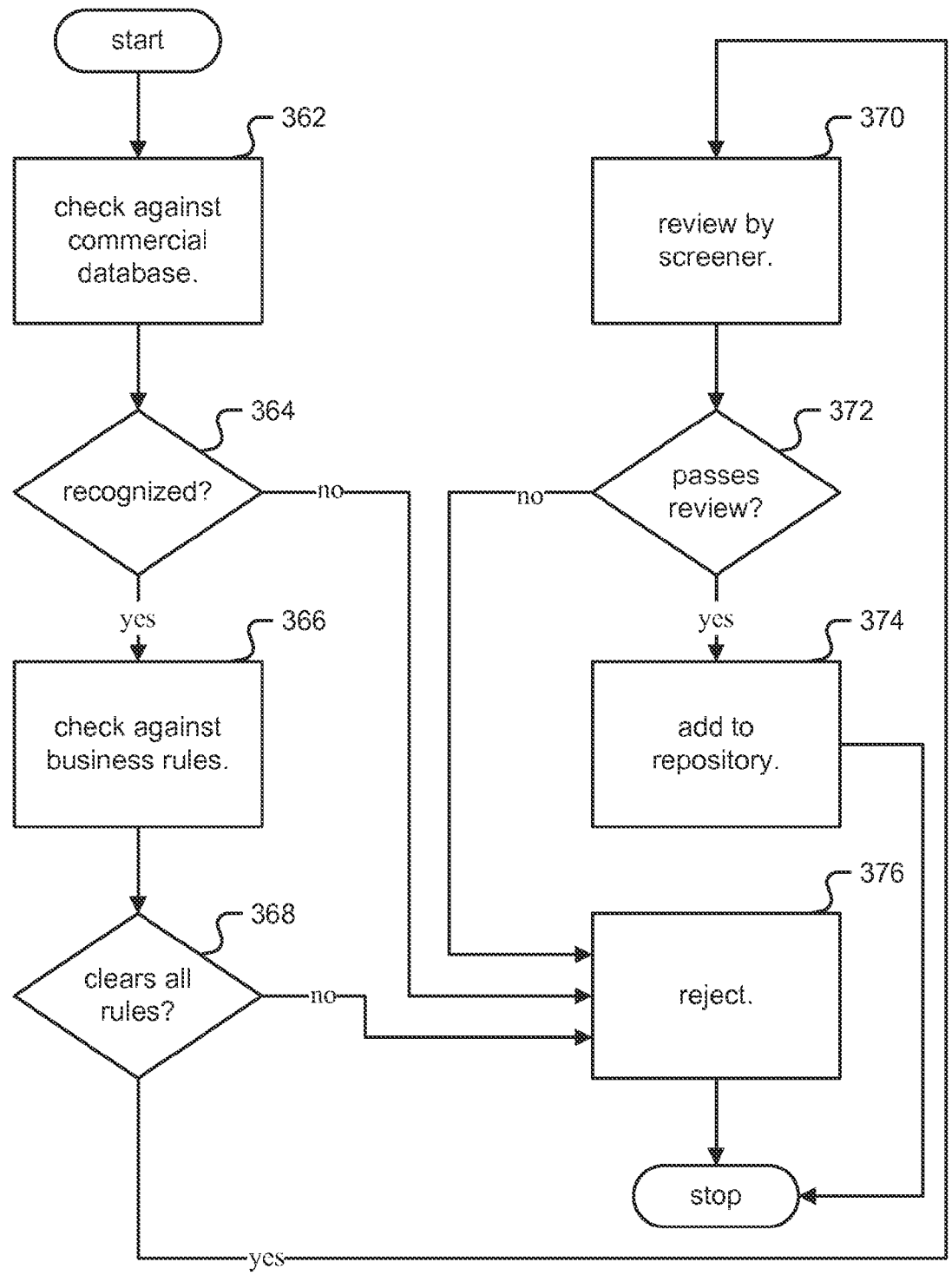
FIG. 3B is a flowchart illustrating an embodiment of a process for commercial track uploading.

FIG. 3B is a flowchart illustrating an embodiment of a process for commercial track uploading. The process may be implemented by media ingestion and metadata server 332 and/or social broadcasting server 104.

The track is checked against a commercial database (362), for example an electronic media identification service. If (364) it is not recognized, it is rejected (376), otherwise the track is checked against business rules using metadata provided by the uploader and/or the commercial database (366). Examples of business rules include those interpreted and/or provided for by moderation server 316. If (368) it does not clear all rules, it is rejected (376), otherwise the track is reviewed by a screener to find any problems missed by automated testing (370). If (372) it fails the review, it is rejected (376), otherwise it is added to the media database 340 with the appropriate metadata (374).

Figure 3C:
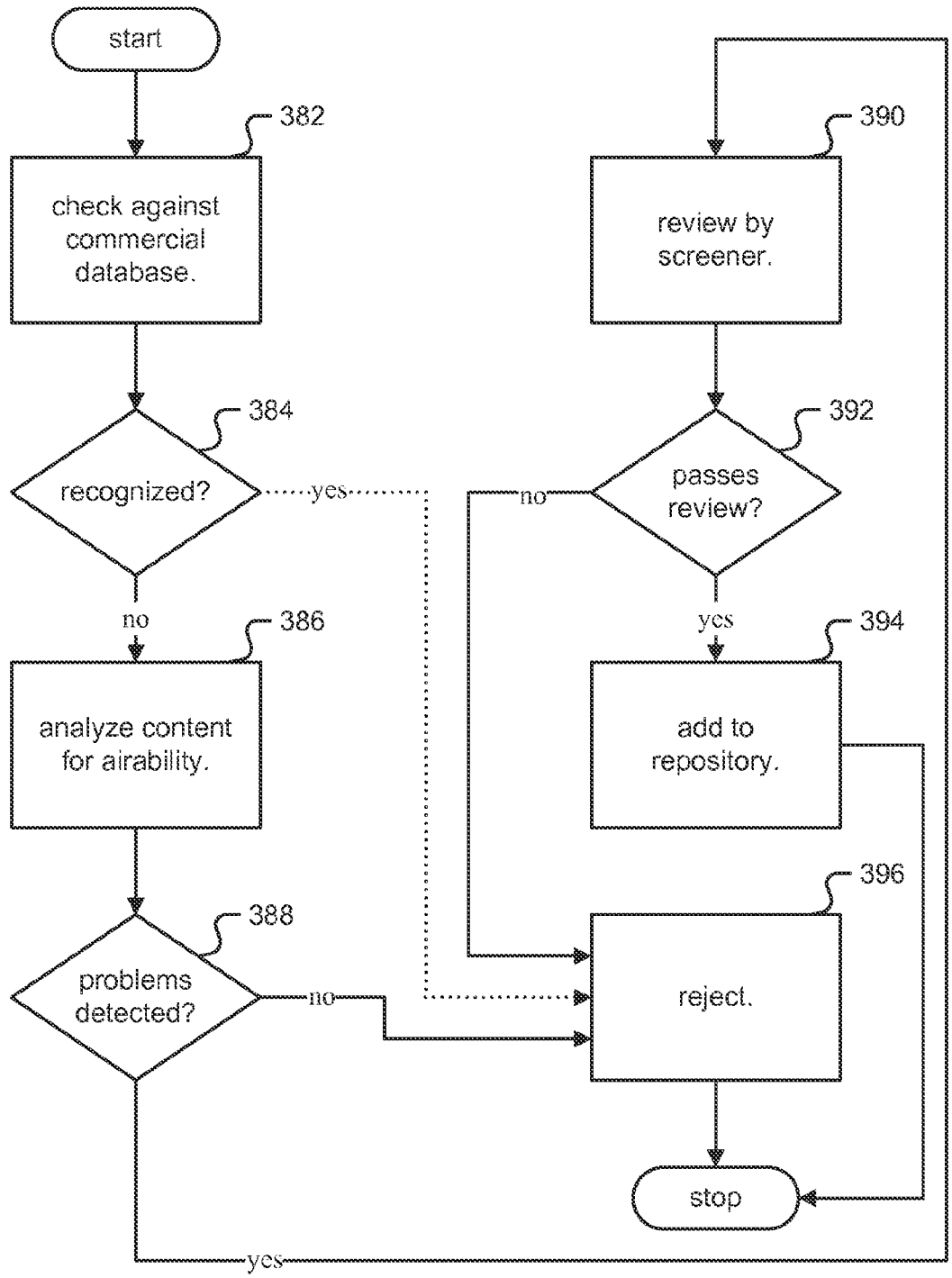
FIG. 3C is a flowchart illustrating an embodiment of a process for user-generated content uploading.

FIG. 3C is a flowchart illustrating an embodiment of a process for user-generated content uploading. The process may be implemented by media ingestion and metadata server 332 and/or social broadcasting server 104.

The content is checked against a commercial database (382), for example an electronic media identification service. If (384) the content is recognized as a commercial track, in one embodiment (not shown) the system may offer to submit it as a commercial track, and if the offer is accepted, follow the workflow in FIG. 3B, step 366, and otherwise reject it (396). In another embodiment (shown by the dotted line) the system may simply reject any recognized commercial track (396). The content is analyzed for "airability" (386), analogous to rules interpreted and/or provided for by moderation server 316. This may involve automated, semi-automated and/or manual ways of rendering the content to analyze for airability. If (388) problems are detected, the content is rejected (396), otherwise the content is reviewed by a screener to find any content issues (390), such as illegal recordings or profanity. If (392) it fails the review, it is rejected (396), otherwise it is added to the media database 340 with the appropriate metadata (394).

Rules Engine. In some embodiments, rules engine 308 is used to temper the indication of control from the user community with regards to what tracks are played on-air and in what order from gaming platform server 322 with a combination of guidelines and rules, such as station policies and regulations from regulators 110. Throughout this specification, a "track" refers without loss of generality to any piece of media content, including a song, audiobook, sound bite, audio clip, video clip, video, music video, movie or game.

For example, tracks elected by the users may be deferred, or other tracks may be inserted, based on business rules. These rules may be static which apply at all times or dynamic which apply only under certain conditions, such as time of day or size of online audience.

Examples of business rules include FCC regulations for content, including: that indecent and/or profane material may not be broadcast outside the FCC Safe Harbor; three songs from the same recording, or four songs from the same artist or anthology, may not be played within a three-hour period; and two songs from the same recording, or three songs from the same artist or anthology, may not be played in a row. Throughout this specification "anthology" includes a boxed set.

Another example of business rules include FCC regulation policies, including: that a station identifier must be played at the beginning and end of each time of operation, hourly, or as close to the hour as possible, for example at a natural break in program content.

Another example of business rules include station policies, including that: tracks may be limited to certain genres or track lengths; genre changes, also known as "drift" may be limited or slowed; and vote contributions from affiliated stations may be included in the score calculation.

Another example of business rules include discretionary control, including that; certain tracks may be banned; high-score criteria for play may be suspended temporarily, for example to give low-scoring new releases some exposure; and other criteria may be used to determine track play, for example low scoring but fast-moving tracks.

User Experience Effects. In some embodiments, to support the business rules described above, a number of user-experience effects may be defined.

For example, for tracks that are not allowed to be played within a specified period of time, for example based on FCC regulations, or are currently disallowed, for example from an undesired genre, effects include: blocking those tracks from a "Coming Next" candidate list or "carousel", including providing an on-screen explanation for why the track cannot play, for example a popup window on item rollover; removing such items from the "Coming Next" candidate list, including providing an on-screen explanation when the items are removed; bombing such items if they are currently playing, including providing an on-screen and/or on-air explanation when they are bombed; disabling rockets for those tracks, including provide an on-screen explanation for why the rocket is disabled, for example a popup window on a Rocket tool rollover.

For example, for an already rocketed track that is deferred indefinitely, effects include: clearing the rocket, including notifying the user that applied the rocket and/or refunding the rocket to that user. An alternate policy may be considered, including defering the track, but playing it as soon as it is allowed and notifying the user that applied the rocket.

Moderation Server. In some embodiments, moderation server 316 includes moderating by removing media or portions of media because: Material is obscene (contains graphic sexual descriptions, sounds or imagery, contains suggestive sexual content, or other sexual content); Material is indecent (contains sexual or excretory sounds or imagery, descriptions or depictions, contains descriptions or depictions of sexual or excretory organs, contains material appearing to pander or is used to titillate or shock, or contains profane language); Material is violent or repulsive (contains graphic descriptions of violence, contains material describing animal abuse, or contains shocking or disturbing material); Material is hateful or abusive (promotes hatred or violence, or promotes bullying tendencies); Material infringes rights (infringes copyright or infringes privacy); or Material is not relevant for broadcast, for example spam.

Gaming Platform Server. Examples for voting dynamics for gaming platform server 322 include the social broadcasting community participating through a collection of connected services and devices. The following paragraphs [0069]-[0093] describe features included in various embodiments of "voting dynamics" as embodied throughout this specification.

The economy of the service may be point-based, with a variety of income sources and expense types, including Income, Expenses and Tokens.

"Income" refers to points received by participating in, or contributing to, the community. This can be further broken down as follows:

Awards, as points granted as a result of active participation, for example being an active voter. These can be thought of as "thank-you" points, or a kind of "allowance" for being an active part of the community;

Earnings, as points granted as a result of explicit contributions to the community, for example for each vote, or for content uploads. This can be thought of as payment or compensation for those contributions;

Gifts, as points granted unrelated to a user's activity, for example bonus points as part of a promotion; and Cash Purchases, as points purchased with cash.

"Expenses" refer to points spent to acquire something of value within the community. These fall into the following categories:

Assets, as items that users can collect, view, and share, for example custom icons for their profile;

Level, wherein a user's influence in the community may be a function of their level, for example the power of their votes;

Access, wherein users can pay to gain access to the station for a period of time. This is defined throughout this specification as a "shout-out";

Actions, wherein users can force a specific event to occur, for example a bomb or rocket; and Products, wherein users can spend points to buy tangible products, for example merchandise, memorabilia, t-shirts, and/or music downloads.

Tokens. Points can be granted in the form of "tokens" that can be redeemed for specific Expense categories described above. They can be received as any of the listed Income categories. There are two kinds of tokens: Bankable tokens, that can be saved for use at a later time. For example, a bomb is an "action" token; and Immediate use tokens, that are used/spent as soon as they are granted. For example, a user may receive a "level" token to increase their power level.

Expense categories may refer to items that are in either limited or unlimited supply. This may be based on physical constraints, for example the limited amount of airtime available, or artificial constraints, for example only a limited supply of "bombs" are available each day. Supply of all items will be managed to ensure the community and its economy remain healthy and/or reasonable.

The support of user-to-user exchanges of points or other expensed items between members of the community may be supported. This may take the form of: Discretionary transfers from one user to another, for example, as a means for users with large point balances to help a new user get started; and Thefts from a user, for example as part of the gaming dynamics, for example, by offering a power-up that allows a user to "steal" points from another.

Income. The ways in which users can receive income may be tabulated as follows:

| Income | Type | Token? | Description |
|---|---|---|---|
| Sign-Up | Award | | "Starter" balance when first signing up. |
| Vote Cast | Earning | | Each vote cast. |
| Frequent Voter | Award | | Achieved "frequent voter" status. May be granted on a recurring basis as long as this status is maintained. |
| First Mover | Award | | First voter on a track. |
| Influencer | Award | | Early voter on tracks that achieve a certain level of popularity. |
| Promotion | Gift | Optional | Result of a promotion. May be in the form of a Token. |
| Item Uploaded | Earning | | Uploaded an item. Value is a function of type of item uploaded. |
| Group Host | Earning | | Formed a Group. May be granted on a recurring basis as long as host role continues. |
| Evangelist | Earning | | Brought a number of users into the Jelli community. |
| Profile Updated | Award | | Added additional information to their user profile. |

The value of each income type may be tuned to support a fair, fun and vibrant community. Income sources may be in the form of tokens, as appropriate.

The ways in expenses are found in the community may be tabulated as follows:

| Expense | Type | Token? | Description |
|---|---|---|---|
| Custom Icon | Asset | Optional | A custom decorative icon that can be shown in a user's profile. |
| Custom Stinger | Asset | Optional | A custom audio "stinger" that can be associated with a user's profile. (An "audio icon") |
| Level Bump | Level | Y | An increase in level. |
| Shout-Out Audio | Access | Y | Buy time on-air to play a personal recording. |
| Shout-Out Text | Access | Y | Buy space on the site for a personal message. |
| Bomb Track | Action | Y | Apply a Bomb to any track. |
| Bomb On-Air | Action | Y | Apply a Bomb to the currently playing track. |
| Rocket Track | Action | Y | Apply a Rocket to any track |
| Catalog Item | Product | | Purchase a catalog item (such as a t-shirt). |
| MP3 Download | Product | | Purchase a music track for download. |

The point cost of each expense may be tuned to support a fair, fun and vibrant community. The expense may be in the form of tokens, as appropriate.

Voting. Tracks may be added to the broadcast stream based on their score. At any given time, the next track to be played is the highest scoring one, unless overridden by business rules or any unexpected events. The score of a given track can be expressed as: Track Score=$f$(Votes, Power-Ups, Time, User Activity, Number of Active Users). One example to relate scores to tracks is: a "Yes" vote contributes a score of 1 to a track; a "No" vote contributes a score of −1 to a track; and "Abstain" (i.e. neither a "Yes" nor "No" vote) contributes a score of 0 to a track.

A given user's vote may have a limited lifetime. One example of how a value of a given vote decays over time is: a vote retains its full value until t1, then linearly approaches a value of 0 at t2, passing through threshold v. If a track gets on air, users may continue to vote on it, but if enough users vote an on-air item down, such that its score is reduced by g % of its "winning score" then that track is immediately treated as if it were bombed, or taken off air immediately. An example of a winning score would be the score at the time it went on air.

After a track gets on-air and finishes playing without getting bombed, the decay for all votes applied to that track may be accelerated such that they drop by p % of their current value; normal decay may then resume. This helps prevent the track from remaining a top-scorer indefinitely, but still keeps users' votes active.

The vote tools shown for each track may indicate the age of a cast vote. Users may be kept informed of the status of their votes, via system messages. For example, a user may receive a warning message when absolute value of their vote drops below the threshold, v, inviting them to "recast" their vote. Another example is that a user may receive a message when their vote value reaches 0, inviting them to "recast" their vote, and re-add the item to their active list.

Example values for the decay and threshold parameters are:

| Parameter | Definition | Value |
|---|---|---|
| t1 | Time for which vote retains its full value | 1 day |
| t2 | Time at which vote value is linearly approaches 0 | 1 week |
| v | Vote value (+ or −) at which user is sent a warning message | 0.2 |
| p | Percentage drop in vote value when track finishes playing on-air | 75% |
| g | Percentage drop in score of an on-air track that will cause track to be bombed | 25% |

Power-Ups. Power-ups may be earned based on business rules, and a user may earn any number of each kind of power-up, wherein earned power-ups are stored on the user's account. Power-ups may be of single-use or multi-use and a power-up is deducted from the user's account once it's used. The score contributions of power-ups do not decay, unlike votes, but they are removed once the intended outcome of a power-up is achieved. For example the score contribution of a rocket is removed once a track is played on-air, or the track is bombed.

Bomb. When a bomb is applied to a track, its score may be adjusted by setting its track score to zero. This also means that all votes cast for that item by other users are cleared. In contrast, if users vote down an on-air track such that its score is reduced by g % of its winning score, that track is treated as if it was bombed but in that case, users' votes for this item are not cleared.

If a bombed track has an active rocket applied, the user who applied the rocket may be compensated by refunding the rocket or automatically reapplying the rocket to the track at the next opportunity.

Rocket. When a rocket is applied to a track to ensure that it gets into a "Coming Next" carousel, its score may be adjusted by setting its track score to the score of the highest scoring track at that moment added to the carousel vote flow for half of the time remaining before the next play.

In some embodiments, a given track may only have one rocket applied at a time. If a given song has already been rocketed, but not yet played or bombed, its rocket tool may be disabled, and a track's rocket is cleared once its played or bombed.

The "carousel vote flow" may include votes collected for any items while they are in the "Coming Next" carousel. Votes collected for items before they appear in the carousel are not counted in this vote flow.

Virus. A virus may be applied to the entire social broadcasting service or associated station. Examples of these include: a "Decay Virus", wherein the decay rate of all votes is adjusted for a length of time; a "Genre Virus", wherein scores of tracks in a given genre are adjusted by a specified amount or percentage; and a "Neutron Bomb" or "Atomic Bomb", wherein vote values for all tracks are reduced by a specified amount or percentage.

Levels. A user's level may be a measure of their degree of participation for example, Level=ζ(User Activity, Length of Membership), where User Activity includes both routine actions such as voting, and special actions such as participation in contests or other directed activities. Each level may include certain benefits, such as increased income, increased strength of votes and power-ups, and various kinds of social recognition. Users may increase their level in a number of ways, for example when their gross point income reaches certain thresholds, or when they participate in a particular activity, or complete a particular task. There may be a plurality of levels defined, different criteria for moving between them and benefits associated with each level.

Status. A user's status may be a way of recognizing and indicating their value to the community. It may be based on a number of factors, for example: their voting frequency, their length of membership, their record of voting for winning aired tracks, and their explicit approval by the community. Status may be used just as a social recognition with no tangible benefits, or it may include specific rewards and benefits.

Scheduled Events. Certain events, including changes in system behavior, may be scheduled to occur at various times, for example: at particular times of the broadcast day, or on special days as specified by the service or station operators. Examples of such events include: vote resets, wherein the station may decide to reset all votes to 0 periodically, in order, for example, to provoke a genre shift, or to clear out a stale playlist; active listener filtering, wherein the station may decide to only count the votes of online listeners during certain parts of the day (for example, to give late-night listeners more control over the playlist, by ignoring votes from daytime-only listeners.)

Broadcast Platform Network Interface. In some embodiments, broadcast platform network interface 336 interfaces with broadcast platform 116 using a broadcast compliant program stream comprising content, playlists, metadata, and playback syntax. In some embodiments in lieu of content, a link to content or an identifier to content is used in order for the content to be directly sent to, received by, or downloaded by the broadcast platform 116 using the link or the identifier. In some embodiments the program stream is written in XML.

Figure 4:
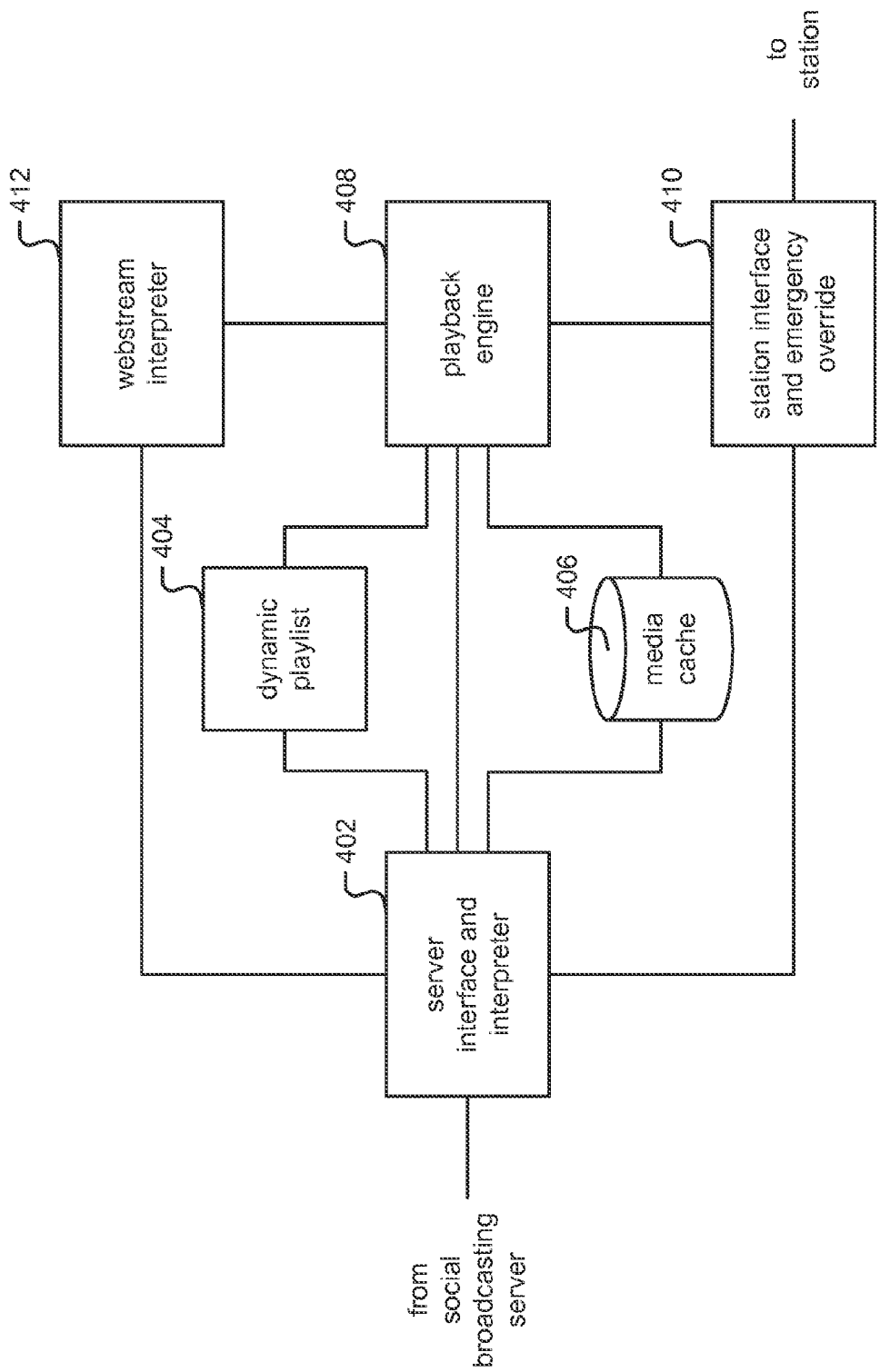
FIG. 4 is a block diagram illustrating an embodiment of a broadcast interface for interfacing social broadcasting with a media or broadcast station.

FIG. 4 is a block diagram illustrating an embodiment of a broadcast interface for interfacing social broadcasting with a media or broadcast station. In some embodiments, the broadcast platform 116 in FIG. 1 is included in the system shown in FIG. 4.

Server interface and interpreter 402 couples the social broadcasting server 104 with dynamic playlist 404 and media cache 406, both of which are coupled with playback engine 408. Server interface and interpreter 402 is also coupled to emergency override/station interface 410 and webstream interpreter 412. The emergency override 410 is coupled to a media or broadcast station 118.

In some embodiments, the social broadcasting system includes a server interface 402 to connect to a network, such as the Internet. A dynamic playlist 404 and updates thereto are received via the server interface 402, for example from social broadcast server 104. In some embodiments, interpreter 402 includes a language interpreter or an XML interpreter to parse the content and data from broadcast platform network interface 336 and/or social broadcast server 104. In some embodiments, a link or identifier is used to download content directly from the server interface or from another network. A media cache 406 is used to cache downloaded content received via server interface 402 which content may be included in the broadcast, if included and if so at a time/slot indicated by dynamic playlist 404, as updated.

In some embodiments, candidate content may be cached at media cache 406 prior to a final determination being made as to whether such content will be included in the broadcast and if so when, so that content that ultimately is determined to be included in the broadcast is available when it is required.

Throughout this specification, a dynamic playlist 404 may include a program stream or an interpreted program stream. In some embodiments, the cache is temporarily or permanently in line with content license guidelines, i.e. statutory licenses, etc. The dynamic playlist 404 and downloaded content in cache 406 are used by playback engine 408 to generate and provide via station interface 410 for broadcast a broadcast stream. The webstream interpreter 412 provides an interpreter for the broadcast stream for webstream output, to substitute or supplement a broadcast output through station interface 410.

In some embodiments playback engine 408 is an audio playback engine. In some embodiments playback engine 408 is a video playback engine. In some embodiments, audio playback engine 408 performs audio processing on content to be included in the broadcast, for example by adjusting levels, generating fade ins/outs and/or other transitions, etc., as required to provide a content stream that is ready for broadcast without further processing. In some embodiments media cache 406 stores static content such as bumpers, chrome or media clips. Throughout this specification "bumpers" refer to any segue between pieces that may include liners, bumpers, chrome, teasers, IDs, sweeps, sweepers, dry sweepers, station imaging, stingers, identifiers, promos, shotguns, voice overs, and intros. In some embodiments media cache 406 stores content management logic. In some embodiments playback engine 408 provides programmed delay or contingent delay to synchronize external constraints and/or programs.

In some embodiments, an administrative and/or web interface (not shown) is provided to enable settings on broadcast interface in FIG. 4 to be adjusted or tuned, for example, by adjusting an audio level, by adjusting video brightness, adding or removing audio/video effects, controlling the manner and timing of transitions, setting or tuning content, user participation, or other filters and/or rules, etc.

In some embodiments, the social broadcasting server 104 and/or broadcast interface in FIG. 4 include(s) dynamic and automated play list generation logic, which combines user input, business requirements, regulatory requirements, broadcast quality logic, advertising requirements, gaming requirements and user attributions to generate dynamically a playlist that results in a broadcast that satisfies all requirements.

In some embodiments, web services and tools binding the web interfaces directly to the broadcast device, agnostic to broadcast technology, mediums or protocols, are provided. In some embodiments, time and scheduling synchronization, play list updates, device monitoring and status, playback status, etc. are provided. In some embodiments, real-time or near rear-time events may be coordinate with a broadcast, included in real-time or near real-time in a broadcast, and/or are otherwise supported.

In some embodiments the emergency override stage 410 handles emergency events, for example an Emergency Broadcast System cut-in, that occur outside the control of the social broadcasting system. When such events occur, the social broadcasting system may be notified so that the program stream and/or broadcast stream can be adjusted accordingly.

Figure 5:
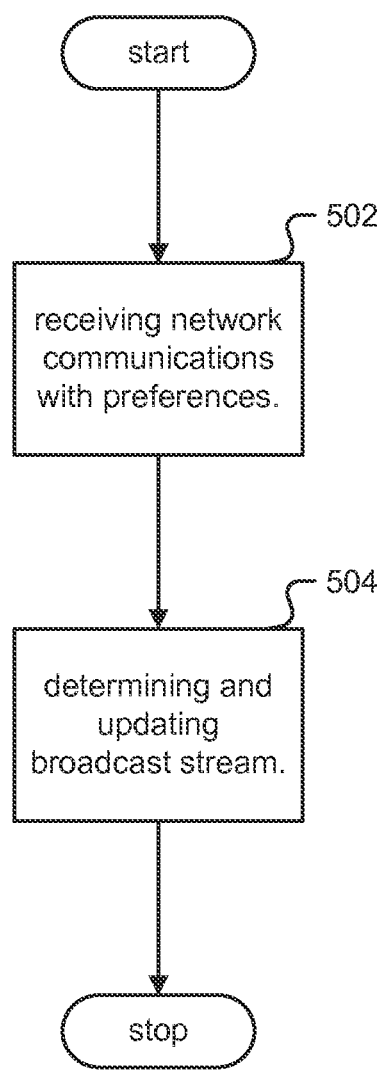
FIG. 5 is a flowchart illustrating an embodiment of a process to provide social broadcasting.

FIG. 5 is a flowchart illustrating an embodiment of a process to provide social broadcasting. The process may be implemented by user interface 102, social broadcasting server 104, and/or broadcast platform 116.

In step 502, one or more network communications are received from a plurality of users of the broadcast. The network communications are received via a network other than a broadcast medium via which the broadcast is received by the plurality of users of the broadcast. In some embodiments, the network communications are received via the Internet and/or another public or private computer network and the broadcast is provided via radiofrequency transmission, e.g., a terrestrial or satellite radio or television broadcast. Each network communication indicates a preference of the sending user with respect to inclusion or non-inclusion of a content of the broadcast. In some embodiments, the network communications are received using user interface 102 via the Internet and associated networks. In some embodiments, the preference includes a vote as described for gaming platform server 322. In some embodiments, the users include media consumers 202, groups 204, content providers 108, promoters 112, advertisers 114, and other business partners.

In step 504, the social broadcasting server 104 processes the network communications to determine a broadcast stream reflective of the users' preference. As subsequent input is received, e.g., from additional users, the broadcast stream is dynamically updated to reflect such subsequent input. For example, a song A may be slated initially for inclusion in the broadcast at an anticipated time t1, based on user input received as of a particular playlist generation time. Subsequently, input received from additional users, e.g., if a surge of users expressed a preference for (or against) the song A subsequent to the time the initial playlist was generated, in some embodiments the playlist would be updated dynamically to reflect such subsequent input by moving the anticipated broadcast time for song A up (or back). As a particular piece of content approaches a time for inclusion in the broadcast, the program stream is provided to broadcast platform 116. In some embodiments, an algorithm in the gaming platform server 322 or other servers in social broadcasting server 104 is used to select content for broadcast. The program stream may also be determined by other inputs/constraints such as network-owned stations 108, network affiliates 108, content providers 108, regulators 110, promoters 112, advertisers 114, owners, the providers of social broadcasting server 104, formats of content, an audio library 340, and playlist constraints.

Figure 6:
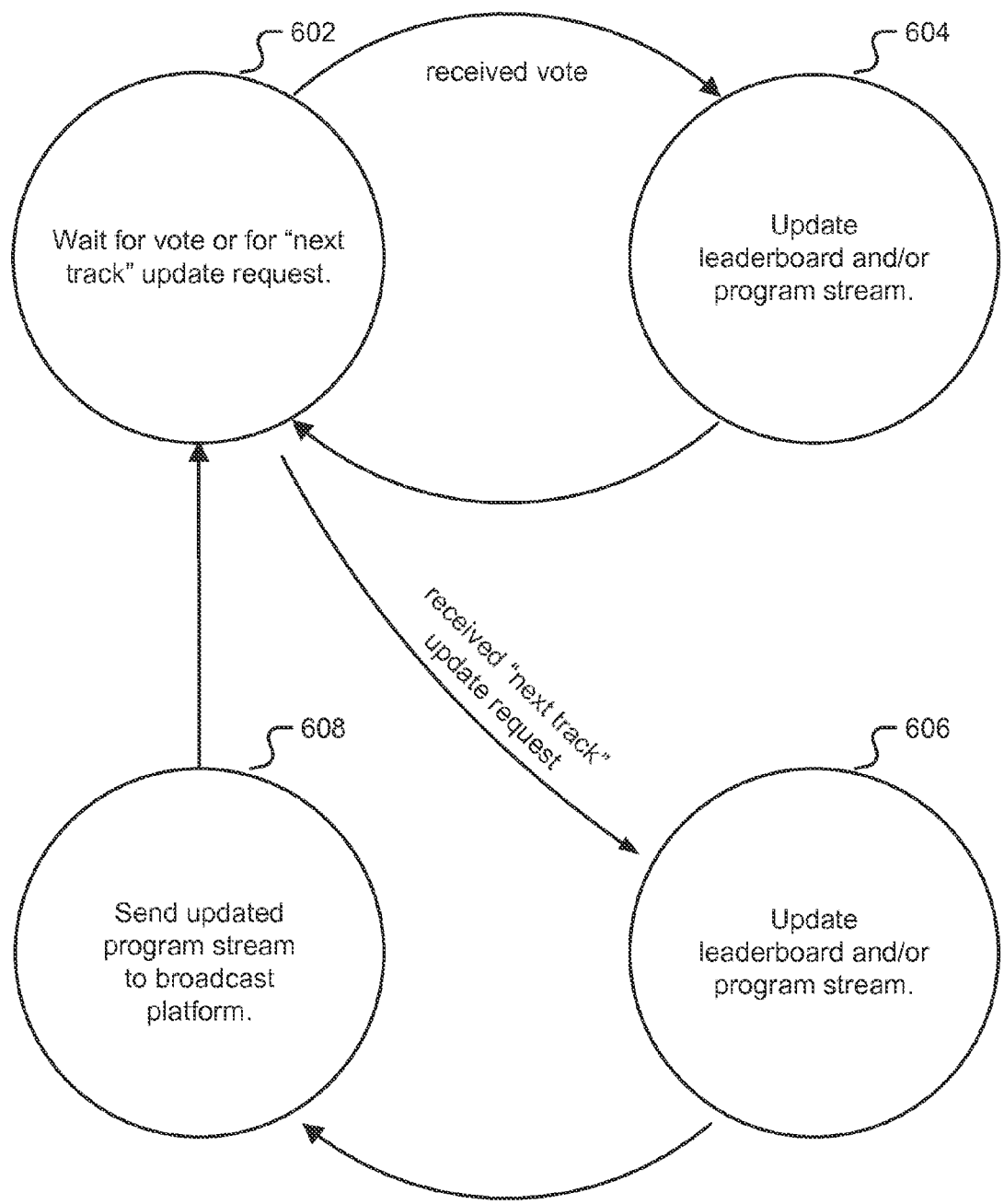
FIG. 6 is a state diagram illustrating an embodiment of a process to determine a program stream reflective of the users' preference.

FIG. 6 is a state diagram illustrating an embodiment of a process to determine a program stream reflective of the users' preference. This process may be implemented in social broadcasting server 104 or gaming platform server 322. In some embodiments, the process of FIG. 6 is included in step 504 of FIG. 5.

In state 602, the server waits for a vote, or for a "next track" update request. In some embodiments the vote is sent by user interface 102, user 202, and/or group 204. In some embodiments the update request is requested by social broadcasting server 104 and/or broadcast platform 116. In some embodiments the update request is sent when the current track being broadcast begins, ends, or is at a threshold of time before ending. In some embodiments the update request is sent when the program stream is at a threshold of total tracks left in a cache, for example media cache 406. In one example the update request may be initiated when media cache 406 is empty or nearly empty. In another example the update request may be initiated when media cache 406 is not full.

State transition from state 602 to state 604 occurs if a vote is received. In some embodiments, the vote would be received as a "Yes", "No" or "Abstain". In some embodiments, facilities are provided to receive simultaneous votes without deadlock or miscalculation.

In state 604, a "leaderboard" keeping track of the top voted tracks is updated. In some embodiments the leaderboard is the same as a program stream. In some embodiments, the leaderboard is a cache stored on the social broadcasting server 104 reflecting the program stream play list. In some embodiments the leaderboard is updated using a sorting architecture and/or algorithm, for example a priority heap or quicksort. In some embodiments updating the leaderboard comprises recalculating one or more votes that delay over time, for example votes that retain full value until t1, then linearly approaches a value of 0 at t2. After the leaderboard is updated, control returns to state 602.

State transition from state 602 to state 606 occurs if a "next track" update request is received. In some embodiments, users are given an indication before a "next track" update request is initiated, for example a countdown or timer. In some embodiments, the timing of a "next track" update request is based at least in part on the program stream.

In state 606, the leaderboard is updated another time, similar to the process in state 604. After the leaderboard is updated, control is transferred to state 608. In state 608, the updated leaderboard/program stream is transmitted to broadcast platform 116. In some embodiments, the top track on the updated program stream will play shortly or immediately on the broadcast platform 116.

Figure 7:
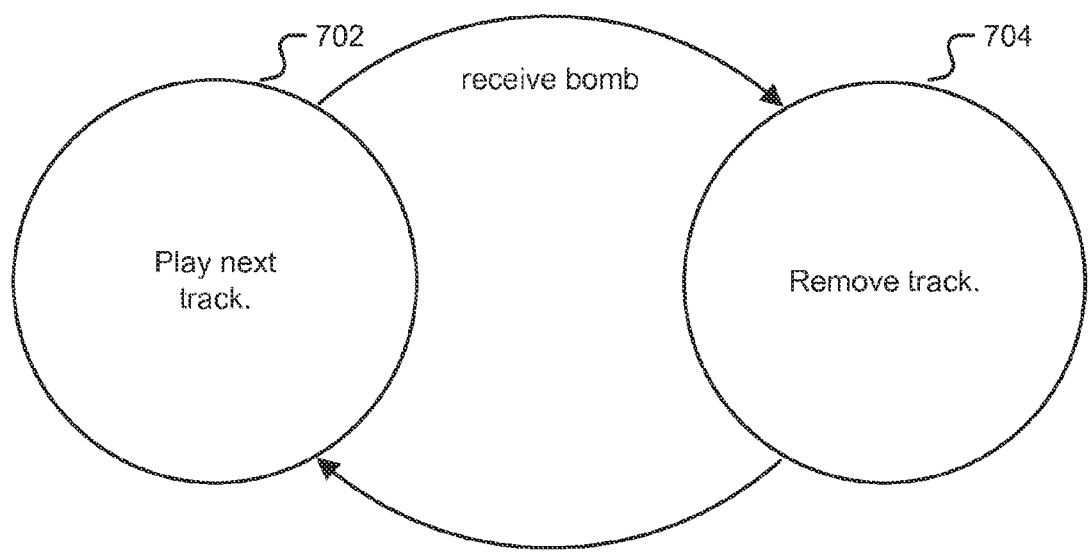
FIG. 7 is a state diagram illustrating an embodiment of a process to remove a track dynamically from inclusion in a broadcast.

FIG. 7 is a state diagram illustrating an embodiment of a process to remove a track dynamically from inclusion in a broadcast. This process may be implemented in broadcast platform 116. In some embodiments, the process of FIG. 7 is included in step 504 of FIG. 5.

In state 702, the broadcast platform 116 is currently playing a track at broadcast station 118. In some embodiments the track was previously the top track in the leaderboard and/or program stream from the process described in FIG. 6. In some embodiments, voting continues even as the track is currently playing at broadcast station 118.

State transition from state 702 to state 704 occurs if the track receives a "bomb". In some embodiments, the track is preempted by a user using exercising special, single use right to preempt a content the user strongly dislikes, e.g., a right earned through participation in a contest or game. In some embodiments a "bomb" is the power-up bomb applied to a track, such that its score is adjusted by setting its track score to zero, and in some embodiments all votes cast for that item by other users are cleared. In some embodiments a bomb may include a scenario where users vote down an on-air track such that its score is reduced by g % of its winning score, and in some embodiments in this scenario users' votes for this item are not cleared. For example, if g % is 75%, users vote down an on-air track when its score is reduced by 75% of its winning score, but the votes for the track will still retain approximately 25% of its winning score for future processing.

In state 704, the track is removed immediately from the broadcast, even if the track has not completed playing. In some embodiments, a bumper and/or chrome is used to announce that the track was bombed off the air, to provide attribution to a user or group responsible at least in part for the bombing, and/or to play an audio avatar or user generated content from the responsible user or group. Control is then passed to state 702.

Figure 8A:
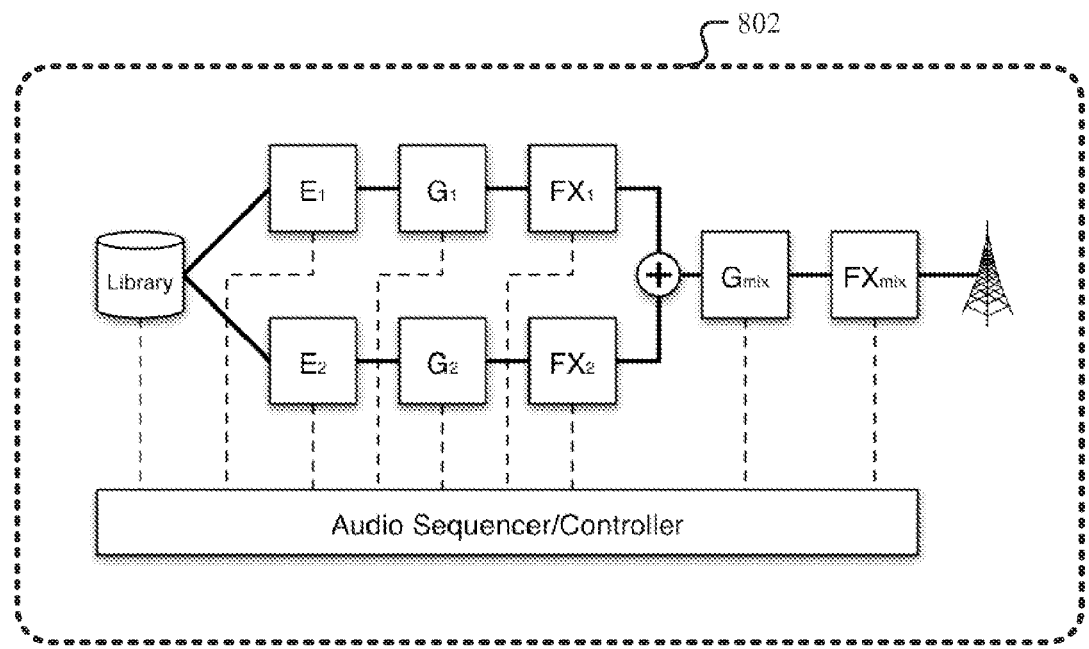
FIG. 8A is a block diagram illustrating an embodiment of a signal flow model for an audio application.

FIG. 8A is a block diagram illustrating an embodiment of a signal flow model for an audio application. In some embodiments, the audio application associated with signal flow model 802 is the media application 320 in FIG. 3. In some embodiments, the audio application associated with signal flow model 802 is the playback engine 408 in FIG. 4.

The following terminology is used for the example of an audio application without loss of generality for other forms of media:
a "stream" is the program the listener hears on air,
an "element" is an item that is part of the stream (e.g. song, user-clip, segue clip),
a "transition" is the change heard between elements (e.g. cut, dissolve),
a "track" is an element, such as a song or joke, that is experienced as primary content,
a "clip" is an element, such as a shout-out or signature, that is inserted by the system based on business rules, wherein clips may be attached to other elements, or inserted between them,
a "stream group" is an ordered collection of elements and transitions, defined by business rules or other core principles, and
a "channel" is an audio layer within a stream, wherein a stream may consist of one or more channels.

The following definitions are used for element types, for the example of an audio application without loss of generality for other forms of media:
a "library track" is a track intended as primary content (usually a song), typically contributed by content owners 108, or by users if approved by a content owner 108 and/or regulators 110,
a "station clip" is non-song content contributed by a station or affiliate (e.g. ads, public service announcements ("PSAs"), station identifications, and/or local promos),
an "ad clip" is an advertisement or other similar content (e.g. PSAs), contributed by a station or advertisers 114,
a "social broadcasting service clip" is contributed by the social broadcasting service of non-song content (e.g. a clip of a bomb explosion for a bomb power-up, a call tone to encourage users to contribute, etc),
a "user track" is contributed by users through user interface 102, for example songs or jokes,
a "user clip" is user-contributed content meant to be attached to a particular song (e.g. shout-outs),
a "signature", "audio icon" or "audio avatar" is user-contributed and/or selected clip meant to identify a listener, not necessarily targeted for any particular song,
a "segue clip" is a clip heard between two other elements, serving to bridge them. For example, in the following sequence:
{SONG|<Cut>|BOMB_EFFECT|<Cut>|BOMB_EXPLAIN|<Crossfade>|SONG},
BOMB_EFFECT is a segue clip, <Crossfade> is a transition, and a segue group may also be defined, combining segue clips and transitions.

In some embodiments, a stream is assembled from three "buckets":
Tracks: These are the items the listeners vote on. They include library tracks and user tracks,
Clips: These are the items inserted into the stream based on business rules. They include station clips, add clips, social broadcasting service clips, user clips, signatures and segue clips,
Transitions: These are the audio experiences heard between tracks and/or clips. They include cuts and cross-fades.

In some embodiments, the rules for assembly are based on the following principles:
The tracks are inserted into the stream based on user activity (such as voting), but may be adjusted or overridden based on business rules (such as restrictions from regulators 110 or FCC regulations), and
Clips and transitions are inserted into the stream based on business rules, addressing at least: Audio design principles (e.g. beat-matching or beat-mismatch masking), regulations from regulators 110, and station policies.

In some embodiments, the stream may consist of one or more channels. The primary channel contains the main program content, such as songs and user tracks. Additional channels may be added to support elements, such as sound effects, that would be heard mixed-in with the primary channel.

In the example shown in FIG. 8A,

E_n is an audio element, provided by a library,

G_n is a gain controller, to control the volume of the associated element, for example to control cross-fades, FX_n is an effects processor, to apply audio effects to the associated element, G_mix is a gain controller applied to the output stream, and FX_mix is an effects processor applied to the output stream.

The gain and effects modules may be treated as a single processing module if that is convenient. The modules shown are in turn controlled by a master audio sequencer/controller, which is responsible for controlling the order of elements played, and the processing applied to them over time, based on business rules.

In some embodiments, a partial list of audio effects includes: graphic equalization, pan/expand, dynamics (frequency specific gain), noise gate/snipper, pitch, envelope, reverb, chorus, flange (wah-wah), distortion, delay/echo, and vibrato.

Figure 8B:
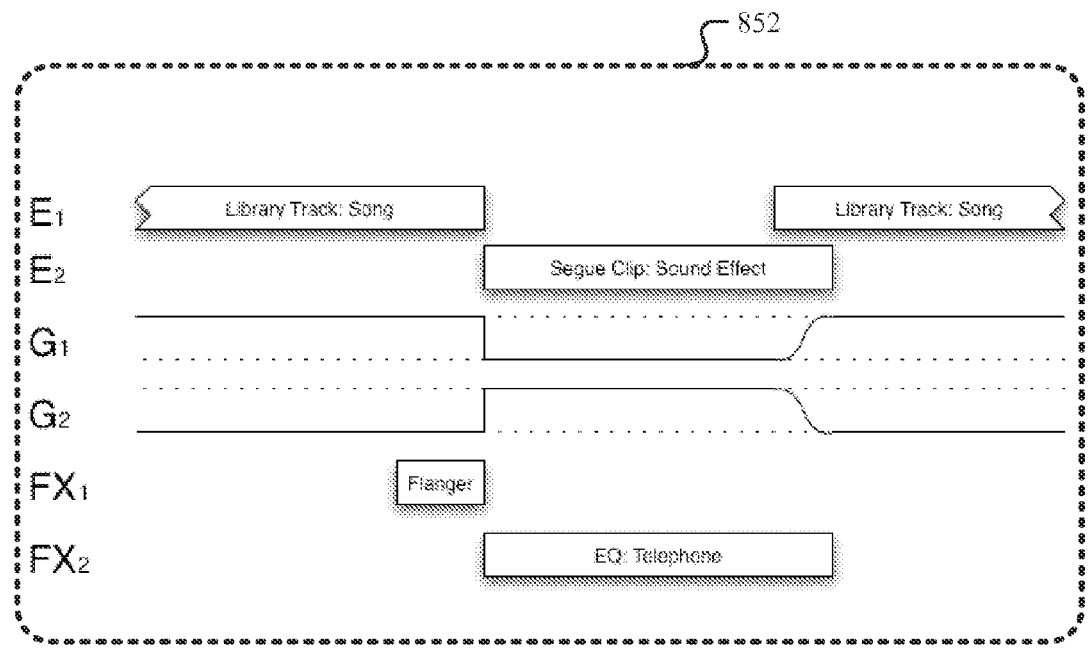
FIG. 8B is a block diagram illustrating an embodiment of a sample stream excerpt.

FIG. 8B is a block diagram illustrating an embodiment of a sample stream excerpt. The sample stream excerpt 852 is based on the signal flow model for the audio application in FIG. 8A. In some embodiments, the audio application is the media application 320 in FIG. 3. In some embodiments, the audio application is the playback engine 408 in FIG. 4.

In this example, a song from the library is followed by a sound effect on E_2 (with a cut transition), which is then cross-faded (see G_1, G_2) to the next song. A flanging effect FX_1 is applied to the end of the first song, and graphic equalization FX_2 is applied to the sound effect to make it sound like it's coming over a phone line. The second song is heard with no effects applied.

Social broadcasting as described herein empowers users to control broadcast content to an extent and in a manner not known before, e.g., by promoting, demoting, preempting, contributing, and otherwise directly influencing the content of a broadcast. Techniques described above may be used to encourage and reward participation by members of a community of consumers of a broadcast, e.g., listeners to a particular terrestrial or other radio station, leading to a broadcast media experience that satisfies and reflects more fully the desires of the community of listeners.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A social broadcasting server, comprising:
a network interface configured to receive a network communications sent by a generating user of a broadcast comprising an indication that a user-generated item of content has been uploaded; and
a processor coupled to the network interface and configured to:
recognize the user-generated item of content is not within a commercial database;
analyze the user-generated item of content for airability; and
generate and provide to a broadcast platform, via one or more network communications sent via the network interface, a metadata indicating a manner in which the user-generated item of content is to be included in the broadcast.

2. A social broadcasting server as recited in claim 1, wherein the broadcast includes one or more of: a radio broadcast, a terrestrial radio broadcast, a satellite radio broadcast, a cable radio broadcast, and a digital radio broadcast.

3. A social broadcasting server as recited in claim 1, wherein the user-generated item of content comprise audio content.

4. A social broadcasting server as recited in claim 1, wherein the user-generated item of content is provided at a time prior to an anticipated time at which it is expected to be included in the broadcast.

5. A social broadcasting server as recited in claim 1, wherein the network interface comprises a first network interface and further comprising a second network interface coupled to the processor and configured to receive user network communications sent by members of a community of users of the broadcast.

6. A social broadcasting server as recited in claim 5, wherein the metadata and the item of content is generated based at least in part on data associated with the user network communications.

7. A social broadcasting server as recited in claim 5, wherein the metadata is updated over time as users participate via the user network interface and the user-generated item of content is one or more of: promoted, demoted, added and removed.

8. A social broadcasting server as recited in claim 5, wherein the metadata is updated by dynamic events as users participate via the second network interface and use one or more of: bombs, rockets and viruses.

9. A social broadcasting server as recited in claim 1, wherein the processor is further configured to receive via the network interface user network communications sent by members of a community of users of the broadcast.

10. A social broadcasting server as recited in claim 1, wherein the processor is further configured to generate and provide to the broadcast platform, via one or more network communications sent via the broadcast platform network interface a second subset of said items of content provided directly by providing a link or an identifier.

11. A social broadcasting server as recited in claim 1, further comprising a text to media server coupled to the media application and configured to generate content from text.

12. A social broadcasting server as recited in claim 1, wherein the processor is further configured to generate and provide to a broadcast platform, via one or more network communications sent via the network interface a program stream, wherein the program stream comprises the metadata and the user-generated item of content.

13. A social broadcasting server as recited in claim 12, wherein the program stream comprises data in an XML format.

14. A social broadcasting server as recited in claim 1, further comprising a rules engine coupled with the broadcast platform network interface and the processor, and configured to determine rules for assembly.

15. A social broadcasting server as recited in claim 14, wherein the rules of assembly include rules for inserting tracks into a program stream based on user activity.

16. A social broadcasting server as recited in claim 14, wherein the rules of assembly include rules to insert clips and transitions based on said rules for assembly including at least one or more of: audio design principles, regulations from regulators and station policies.

17. A social broadcasting server as recited in claim 1, wherein the processor is further configured to generate subsequently transmitted metadata indicating a change in one or both of:
- (1) the user-generated item of content expected to be included in a broadcast and
- (2) the manner in which the user-generated item of content is to be included in the broadcast.

18. A method, comprising:
- receiving a network communications sent by a generating user of the broadcast comprising an indication that a user-generated item of content has been uploaded;
- recognizing the user-generated item of content is not within a commercial database;
- analyzing the user-generated item of content for airability; and
- generating a metadata indicating a manner in which the user-generated item of content is to be included in the broadcast; and
- providing the metadata to a broadcast platform.

19. A method as recited in claim 18, further comprising determining rules for assembly.

20. A computer program product, the computer program product being embodied in a non-transitory computer readable storage medium and comprising computer instructions for:
- receiving a network communications sent by a generating user of a broadcast comprising an indication that a user-generated item of content has been uploaded;
- recognizing the user-generated item of content is not within a commercial database;
- analyzing the user-generated item of content for airability;
- generating a metadata indicating a manner in which the user-generated item of content is to be included in the broadcast; and
- providing the metadata to a broadcast platform.

* * * * *